(12) United States Patent  (10) Patent No.: US 7,428,943 B2
Smiley et al.  (45) Date of Patent: *Sep. 30, 2008

(54) MATERIAL HANDLING VEHICLE WITH ERGONOMIC DUAL CONTROL HANDLE SYSTEM

(75) Inventors: Gregory W. Smiley, Grenne, NY (US); Robert J. Lewis, Binghamton, NY (US); Kurt R. Werner, Auburn, NY (US); H. Scott Ryan, Skaneateles, NY (US)

(73) Assignee: The Raymond Corporation, Greene, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/631,239

(22) Filed: Jul. 31, 2003

(65) Prior Publication Data

US 2005/0023070 A1 Feb. 3, 2005

(51) Int. Cl.
*B66F 9/06* (2006.01)
(52) U.S. Cl. .................. 180/321; 180/324; 187/222
(58) Field of Classification Search .......... 180/321, 180/322, 323, 324, 325, 326; 280/778; 187/222, 187/223, 237; 74/473.12, 471 R
See application file for complete search history.

(56) References Cited

U.S. PATENT DOCUMENTS

| 3,604,528 | A | 9/1971 | Williamson |
| 3,750,834 | A | 8/1973 | Luft |
| 3,937,294 | A | 2/1976 | Haddock |
| 4,016,948 | A | 4/1977 | Kuester |
| 4,141,591 | A | 2/1979 | Spicer |
| 4,212,250 | A | 7/1980 | Burgess |
| 4,318,451 | A | 3/1982 | Liggett |
| 4,638,883 | A | 1/1987 | Miriizumi et al. |
| 4,846,581 | A | 7/1989 | Osterlund et al. |
| 5,190,118 | A | 3/1993 | Yelton |
| 5,226,497 | A | 7/1993 | Beaton |
| 5,285,867 | A | 2/1994 | Pedersen et al. |
| 5,595,259 | A * | 1/1997 | Gilliland et al. ............. 180/332 |
| 6,015,019 | A | 1/2000 | Grimes et al. |
| 6,182,778 | B1 * | 2/2001 | Henshaw et al. ......... 180/89.12 |
| 6,505,695 | B2 * | 1/2003 | Oshima et al. ............. 180/65.5 |
| 6,564,906 | B1 * | 5/2003 | Haack et al. ................ 187/222 |
| 6,679,349 | B1 * | 1/2004 | Pollish, Jr. .................. 180/326 |

OTHER PUBLICATIONS

BT Industries AB, product information disclosure, 3 pages, "BT Reflex Compact Reach Truck with Narrow Chassis," Mjölby, Sweden.

* cited by examiner

*Primary Examiner*—Ruth Ilan
(74) *Attorney, Agent, or Firm*—Quarles & Brady

(57) ABSTRACT

A material handling vehicle includes first and second control handles positioned at opposing ends of an operator compartment. The first control handle is positioned adjacent the forks for driving the vehicle in a fore or forks first direction, and the second control handle is positioned adjacent the back of the vehicle for driving the vehicle in the aft or forks trailing direction. The aft control handle is provided in a twist grip style, which can be gripped easily by an operator facing the aft of the material handling vehicle. The control handles provide stability for the operator and an intuitive operator interface irrespective of direction of travel.

19 Claims, 5 Drawing Sheets

MATERIAL HANDLING VEHICLE WITH ERGONOMIC DUAL CONTROL HANDLE SYSTEM

CROSS REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

The present invention relates to material handling vehicles, and more particularly to a material handling vehicle with ergonomic multiple control handles for operation in a variety of operator orientations.

Material handling vehicles commonly found in warehouse and factory environments include, for example, vehicles in which the operator normally stands on a platform at the rear of the truck, at the end opposite of a load carrying or load handling mechanism, typically employing forks to lift and transport material. To provide an efficient flow of goods in such facilities, operators of these vehicles typically orient their bodies in the most comfortable position for adequate visibility to drive the material handling vehicles in both a forks first direction, with the vehicle forks leading in the direction of travel, and tractor first direction, in which the vehicle forks trail in the direction of travel.

Although in a typical vehicle there are a variety of possible operator orientations, when traveling, an operator will favor positions that maximize comfort and visibility for forks first and tractor first travel. Generally, one operator orientation is used more frequently than the others. The prevalent orientation varies with vehicle design, from facility to facility, within a given facility, and even from operator to operator. There is, therefore, a fundamental need to provide stability to the operator when traveling for all likely orientations, while maintaining operator comfort and the maximum productivity potential of the vehicle.

For these reasons, designers of lift trucks have developed a number of different operator compartment configurations. Available configurations include both standing and seated configurations in which the operator faces either generally to one side or to the front/rear of the truck. Vehicles designed for a standing operator (stand-up vehicles), include both side stance configurations where the operator generally operates the truck when standing facing the left side of the truck and, fore/aft configurations in which the operator may either stand facing the load or away from the load. For each of these configurations, designers have further provided various methods to accommodate operator stability for travel in both the forks first and tractor first directions, and to provide each design with a reasonable degree of comfort for the operator, while ensuring the capability for vehicle productivity. Stand-up vehicle designs, for example, typically impart stability, in part, through hand operated vehicle controls that provide both stability and the means to control the operation of the vehicle. Operator stability when traveling is accomplished through a combination of a solid footing, pads and covers that embrace portions of the operators body, hands on the vehicle controls and an operator advanced knowledge of the commanded vehicle motions.

Typical prior art stand-up vehicles utilize the same control elements to command travel in either direction and for either stance orientation. That is, the truck operator manipulates the same steering device, travel control, and deadman foot control regardless of stance orientation. In the case of stand-up trucks configured in the fore/aft sense, although designed to be intuitive for bi-directional control, some operators nonetheless find the controls more convenient for forks first travel than for tractor first travel. Furthermore, these controls often do not provide maximum comfort for the widest possible range of operator sizes, as the operator must reach beside and slightly rearward of his or her centerline in order to control the vehicle travel speed when driving and facing in the tractor first direction.

BRIEF SUMMARY OF THE INVENTION

In one aspect, the present invention provides a material handling vehicle including an operator compartment having both a fore operator control handle, and an aft operator control handle. The fore operator control handle is mounted to first end of the operator compartment and configured for operation in a fore direction. The aft operator control handle is a substantially horizontal twist grip handle mounted to a second end of the compartment opposite the first end of the compartment, and is configured for operation in the aft direction. A traction system is controlled by the first and second operator control handles to drive the lift truck in a selected direction, wherein an operator can control the traction system while facing either of the first or the second end of the compartment.

In another aspect of the invention, an operator compartment for a material handling vehicle is provided. The operator compartment includes a fore control handle mounted for access by an operator facing a first direction, and an aft control handle mounted for access by an operator facing a second direction. The aft control handle is mounted to be substantially horizontal to a floor of the compartment and is angled at an angle referenced to a side of the compartment selected to be substantially perpendicular to the arm of the operator while in use. A floor switch and a steering wheel are each positioned in the compartment to be accessible by an operator using either the fore control handle or the aft control handle.

In yet another aspect of the invention, an ergonomic lift truck is provided. The lift truck includes a fork, and an operator station from which the operator drives the lift truck. The operator station is at least partially surrounded by an enclosure, and both a fore operator control and an aft operator control are mounted for access on the enclosure. The fore operator control is provided adjacent the fork and is configured for an operator facing the fork to select a direction of travel, while the aft operator control is provided facing the opposite end of the lift truck. The aft handle is a cylindrical twist grip operator control and is configured to be substantially perpendicular to the arm of an operator when the operator is controlling the twist grip to select a direction of travel. A steering mechanism is mounted for access on the enclosure, and is accessible by an operator to select a direction of travel while controlling either the fore or the aft handle.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
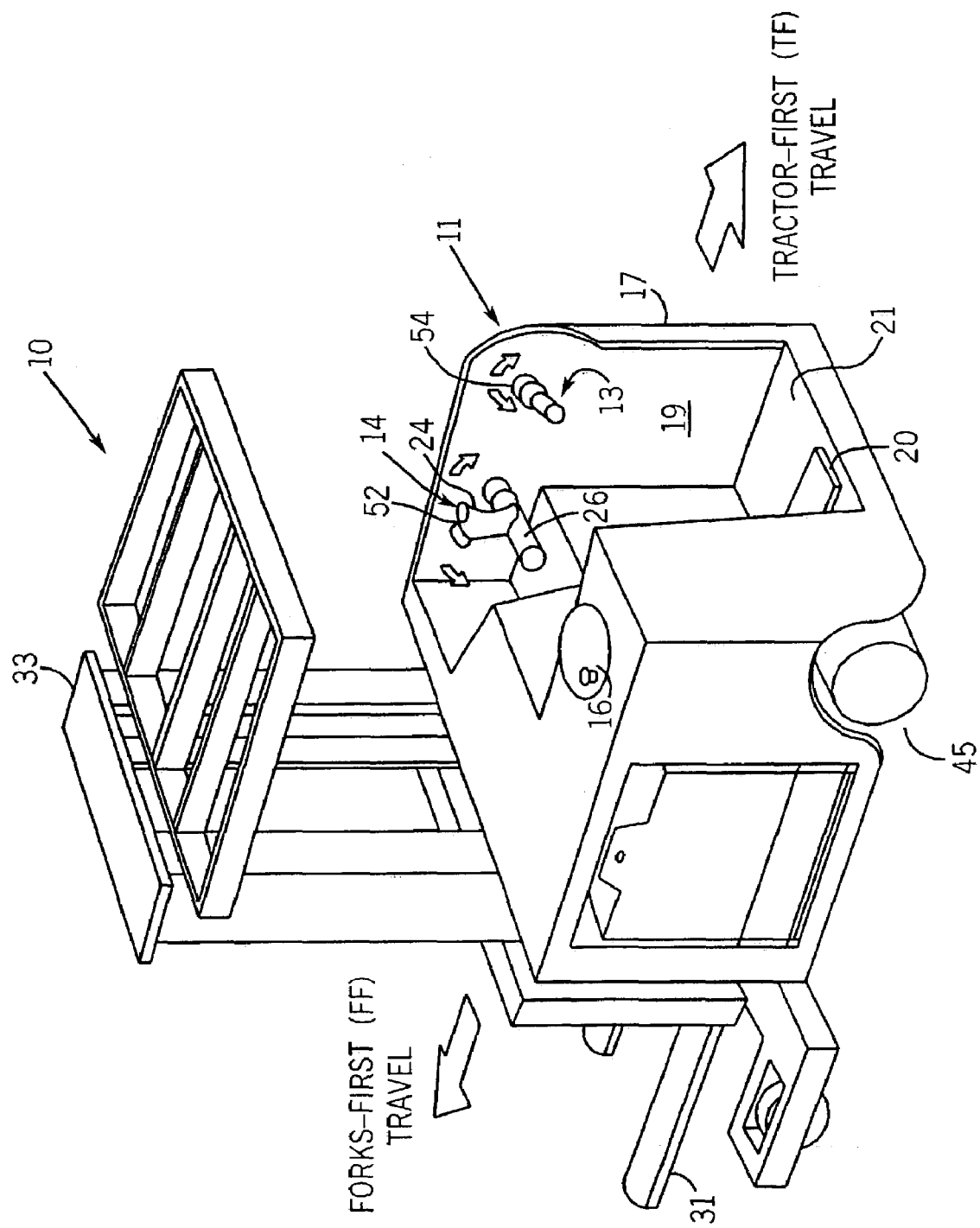
FIG. 1 is a top view of a material handling vehicle constructed in accordance with the present invention with the operator facing aft.

Referring now to the Figures, and more particularly to FIG. 1, a material handling vehicle constructed in accordance with the present invention is shown. The material handling vehicle as shown is a stand-up, fore-aft stance configured lift truck 10 designed to allow the operator to stand facing in the direction of travel, whether travel be in the Forks First or Tractor First direction. The truck 10 includes an operator compartment 11 comprising an enclosure 17 with an opening 19 for entry and exit of the operator.

The compartment 11 includes a first multi-function control handle 14 which is mounted to the enclosure 17 at the front of the operator compartment 11 proximate the forks 31, an aft control handle 13 positioned at the back of the compartment 11, and a floor switch 20 positioned on the floor 21 of the compartment 11 in a location selected to allow the operator to easily access the floor switch 20 when facing either the fore or aft direction. A steering wheel 16 is also provided in the compartment 11 and, like the floor switch, is positioned to allow control by the operator when facing either the fore or aft directions. The position of multi-function control handle 14 is selected to control the speed and direction of travel of the lift truck 10 when the operator is facing the forks 31, and the aft control handle 13 is positioned to control the motion of the lift truck 10 when the operator is facing in the aft-facing direction, as described more fully below.

Figure 2:
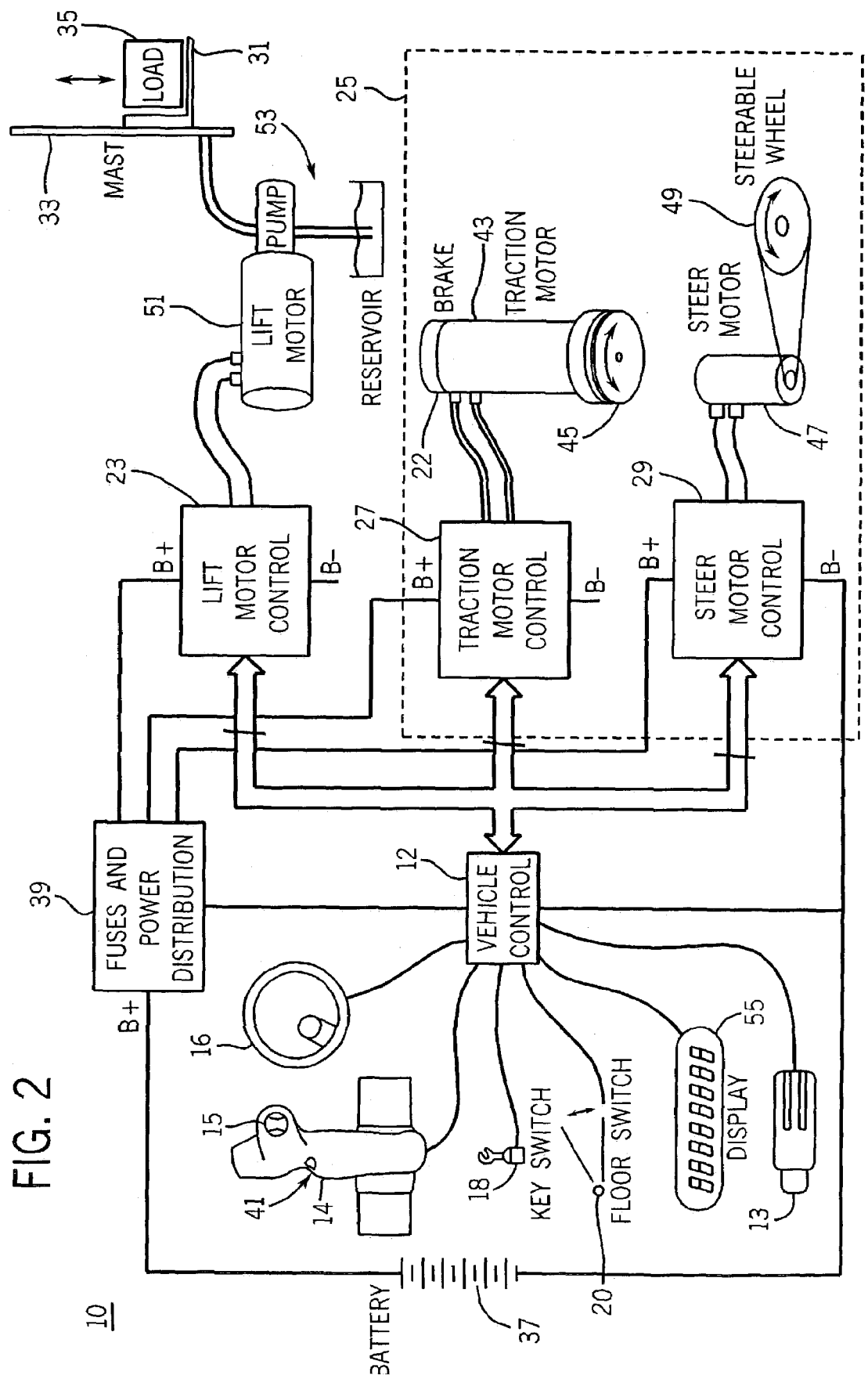
FIG. 2 is a block diagram of the lift truck constructed in accordance with the present invention.

Referring now to FIG. 2, a block diagram of a typical lift truck 10 in which the present invention can be provided is illustrated. The lift truck 10 comprises a vehicle control system 12 which receives operator input signals from the aft control handle 13, the multi-function control handle 14, the steer wheel 16, a key switch 18, and the floor switch 20 and, based on the received signals, provides command signals to each of a lift motor control 23 and a drive system 25 including both a traction motor control 27 and a steer motor control 29. The drive system 25 provides a motive force for driving and steering the lift truck 10 in a selected direction, while the lift motor control 23 drives forks 31 along a mast 33 to raise or lower a load 35, as described below. The lift truck 10 and vehicle control system 12 are powered by one or more battery 37, coupled to the vehicle control system 12, drive system 25 and lift motor control 23 through a bank of fuses or circuit breakers 39.

As noted above the operator inputs include a key switch 18, floor switch 20, steering wheel 16, a multi-function control handle 14, and an aft control handle 13. The key switch 18 is activated to apply power to the vehicle control system 12, thereby enabling the lift truck 10. The floor switch 20 provides a deadman braking device, disabling motion of the vehicle unless the floor switch 20 is activated by the operator, as described below.

Figure 3:
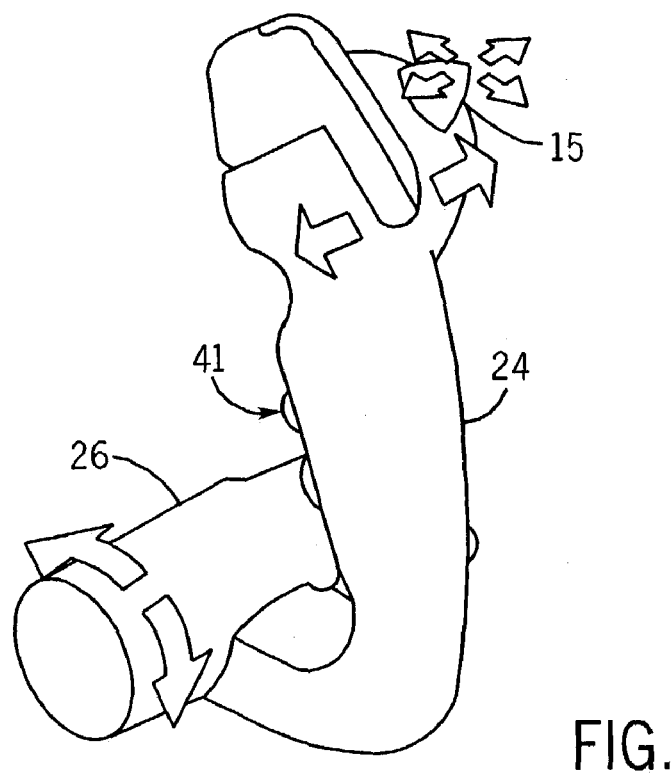
FIG. 3 is a perspective view of a multi-function control handle of FIGS. 1 and 2.

Referring now also to FIGS. 1 and 3, the control handle 14 is a multi-function control which includes both an upright, substantially vertical section 24, and a horizontal section 26, the vertical 24 and horizontal 26 sections together providing a number of control functions for the lift truck 10. The horizontal section 26 includes a transducer such as a potentiometer which provides a travel direction and speed command signal to the lift truck 10 and is configured to provide intuitive control for an operator facing the fore of the vehicle 10 or the forks first direction. The horizontal section 26 is rotated forward towards the forks 31 of the vehicle 10 to provide a forks first directional and speed command and backwards away from the forks 31 to provide a tractor first directional and speed signal to the vehicle control 12, the final speed of travel being determined in both cases based on the degree of rotation. The vertical section 24 includes a four-way switch 15 located on the top of the handle 14 which provides a tilt up/down function when activated in the forward and reverse directions and a sideshift right and left function when activated to the right and left directions. A plurality of control actuators 41 located on the vertical section of the handle 14 provide a number of additional functions, and can include, for example, a reach push button, a retract push button, and a horn push button. The vertical sectional portion further includes a transducer such as a potentiometer providing a lift function control signal to the vehicle control system 12. A number of other functions could also be provided, depending on the construction and intended use of the lift truck 10.

Figure 4:
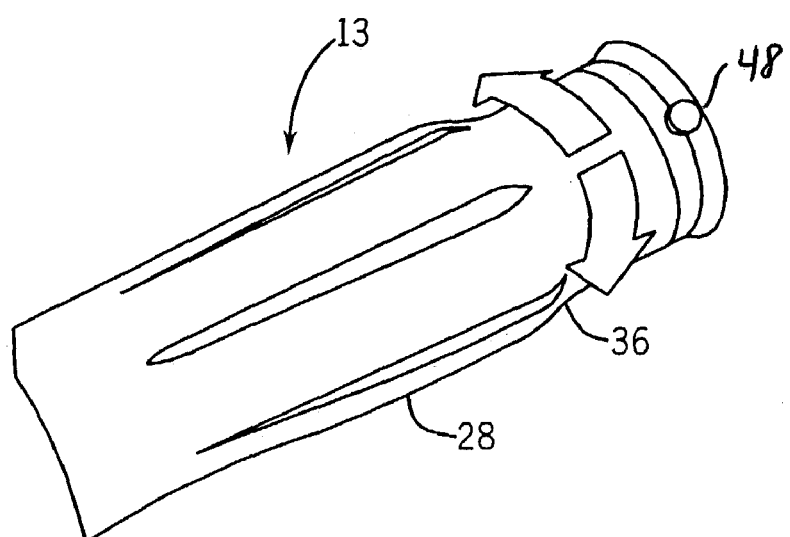
FIG. 4 is a perspective view of an aft control handle of FIGS. 1 and 2.

Referring now to FIGS. 1, 2, and 4, the aft control handle 13 is a horizontally mounted handle which provides directional and speed control signals to the vehicle control system 12 as described with reference to the horizontal section of the control 14 described above. The aft control handle 13 is configured to operate intuitively, and similarly to the control handle 14, for an operator facing the aft of the vehicle. The aft control handle 13 is rotated forward toward the aft of the lift truck 10 to provide a tractor first directional signal and speed command, and in the opposite direction, toward the fore of the vehicle, to provide a forks first directional signal and speed command. Therefore, irrespective of the direction that the operator is facing, a control handle with intuitive operation is provided. When facing either direction, a control is provided which is rotatable in the direction that the operator is facing to cause the lift truck 10 to move in that direction, and which is also rotatable in the opposite direction to cause the lift truck 10 to move in the opposite direction. As described above, the speed request signal provided by the aft control handle 13 is a function of the amount of rotation in a given direction.

Referring again to FIG. 2, as shown, the vehicle control system 12 receives a control signal from at least one of the control handle 14 and aft handle 13 and transmits the control signal to traction motor control 27. Traction motor control 27 activates the traction motor 43 which is connected to wheel 45 to provide motive force to the lift truck 10. The speed and direction of the traction motor 43 and associated wheel is selected by the operator from the control handles 13 and 14, and is typically monitored and controlled through an encoder or other feedback device (not shown) coupled to the traction motor 43. As shown, each of the control handles 13 and 14 provide an individual control signal to the vehicle control system 12 and traction control system 27. In this case, the vehicle control system 12 evaluates the signals provided by each of the control handles 13 and 14 and determines an appropriate speed and direction of travel. Alternatively, the control handles 13 and 14 could be mechanically linked, with either one of the control handles providing a control signal to the vehicle control system 12. In other embodiments, the control handles 13 and 14 can be selectively activated using mechanical or electrical switch devices, activated or deactivated through user interfaces such as the display 55 described below, or otherwise regulated.

The wheel 45 is also connected to friction brake 22 through the drive motor, providing both a service and parking brake function for the lift truck 10. The friction brake 22 is typically spring applied, and defaults to a "brake on" position. The operator must stand on the deadman pedal, actuating floor switch 20, for the brake to be released. The traction motor 43 is typically an electric motor, and the associated friction brakes 22 can be either an electrically or a hydraulically released devices. Although one friction brake 22, motor 43, and wheel 45 are shown, the lift truck 10 can include one or more of these elements.

The steer motor control 29 is connected to drive a steer motor 47 and associated steerable wheel 49, steered in a direction selected by the operator by rotating the steering wheel 16, described above. The direction of rotation of the steerable wheel 49 determines the direction of motion of the lift truck.

The lift motor control 33 provides command signals to control a lift motor 51 which is connected to a hydraulic circuit 53 for driving the forks 31 along the mast 33, thereby moving the load 35 up or down, depending on the direction selected at the multi-function control handle 14. In some applications, the mast 33 can be a telescoping mast. Here, additional hydraulic circuitry can be included to raise or lower the mast 33 as well as the forks 31.

In addition to providing control signals to the drive system and lift control system, the vehicle control 12 can also supply data to a display 55 for providing information to the operator. Displayed information can include, for example, a weight of a load placed on the forks 31, the speed of the vehicle, the time of day, or the state of charge of the battery.

Referring now to FIGS. 1 and 4, as described above, the aft control handle 13 is horizontally mounted and is preferably provided as a cylindrically-shaped, twist grip style handle. The twist grip handle is advantageous because it is relatively small and provides a full range of motion in limited space and, further, provides stability to the operator as the lift truck 10 is in motion. The center core of the aft control handle 13 can be mounted directly to a frame of the lift truck 10, and the outer grip 28 responds to rotational forces about the center axis of the aft control handle 13, remaining stationary relative to arm movements and forces up, down, left, right, toward and away from the operator. The aft control handle 13 is preferably mounted at a height of about thirty-eight inches above the floor 19, and angled front to back (FIG. 1) at an angle of about seventy degrees to the adjacent side wall of operator compartment 11. At this height and angle, the aft control handle 13 has been shown to fit comfortably in an operator's hand at a neutral hand position, and further to be substantially perpendicular to the axis of the operator's arm in use, providing a comfortable grip for operators varying in height between the bottom 5 percent of females and the top 95 percent of males, therefore providing an ergonomic control for virtually all operators. Preferably, the outer grip 28 is a smooth material molded to include recessed grooves 30, which provide a positive, comfortable grip. Although a number of suitable materials are available, one material useful in this application is 10% glass filled polycarbonate thermoplastic. The smooth material grip 28 and recessed grooves 30 are selected to provide a positive yet comfortable grip, and allow for easy movement of the grip around the handle. Referring still to FIG. 4, control handle 13 also includes horn push button 48 allowing an aft-facing operator to sound a warning without removing his or her hand from the handle.

Figure 6:
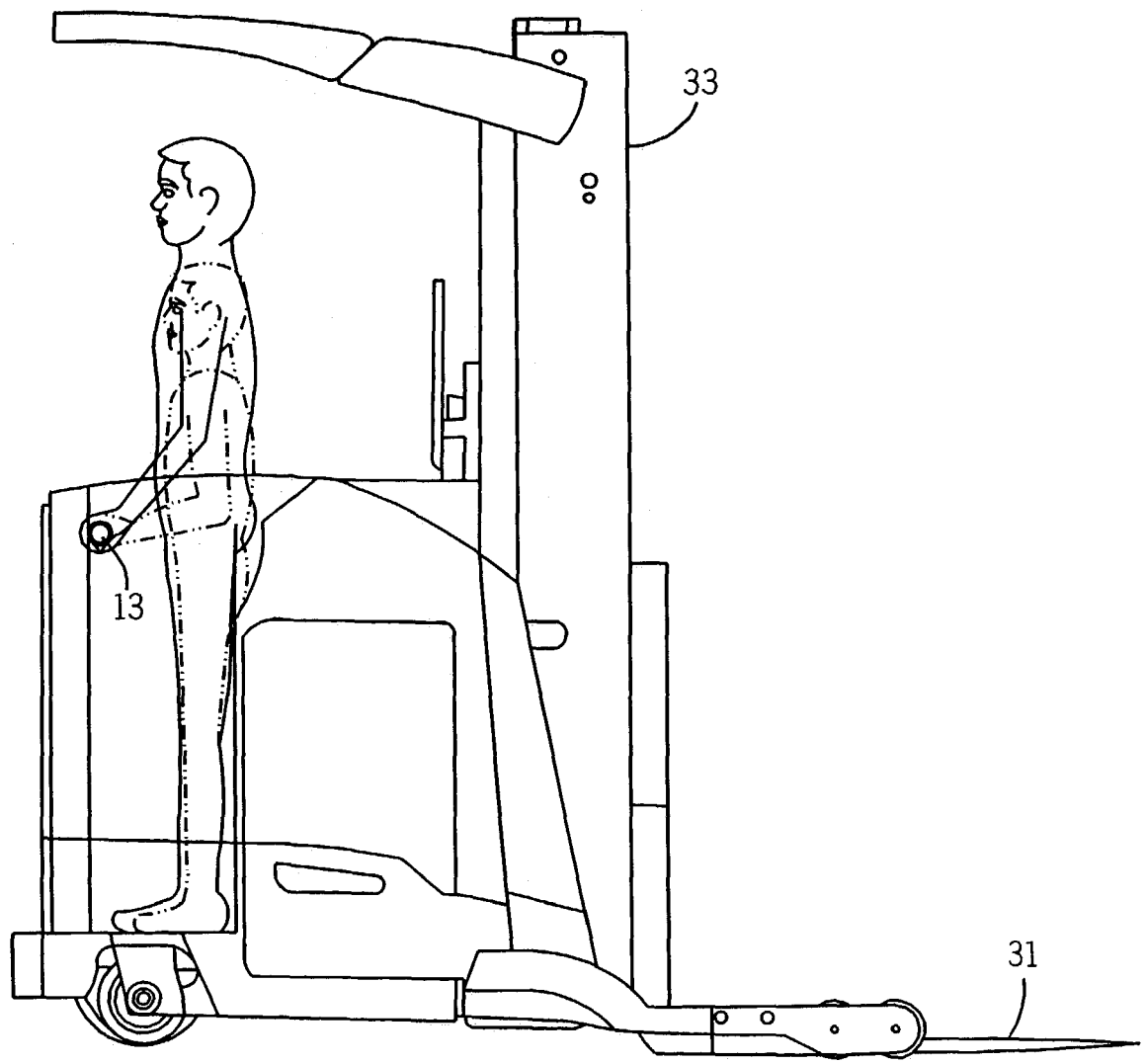
FIG. 6 is a cutaway side view of the material handling vehicle of FIG. 1, showing an operator using the aft control handle.

Referring now to FIG. 6, a side view of the lift truck 10 showing an operator facing aft is shown. In this position, the operator grips the aft control handle 13, such that the operator is facing in the direction of motion. The shape and position of the aft control handle 13 allow individuals of various heights to grip the aft control handle 13 from a variety of approach angles and grip positions. As described above, operation of the handle is simple and intuitive, allowing rotation in the direction of travel when the operator is facing aft, as shown.

Figure 5:
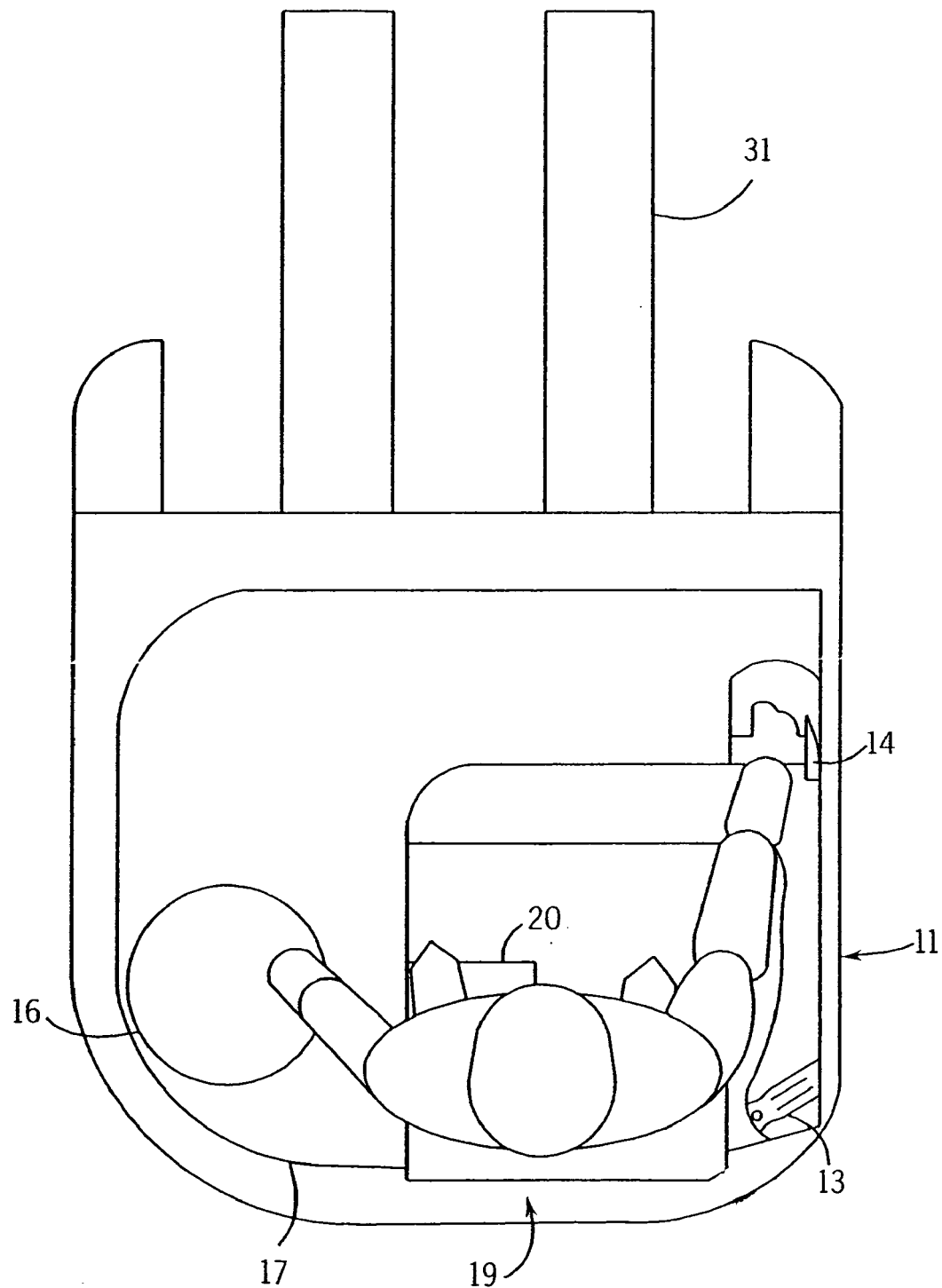
FIG. 5 is a top view of the material handling vehicle with the operator facing fore.

Referring now to FIGS. 1, 5, and 6, in operation, the operator stands in the operator compartment 11 selectively facing either the fore, forks first direction (FIG. 5), or the aft, tractor first direction (FIGS. 1, 6). When operating the vehicle in the forks first direction, the operator controls the direction and speed of motion using the multifunction control handle 14, as described above. The deadman switch 20 provided on the floor of the operator compartment 11 is positioned to be activated or deactivated by the left foot, and the steering wheel 16 is, likewise, operated by the left hand when the vehicle is operated in the forks first mode.

Referring now to FIGS. 1 and 6, while facing the aft direction of the vehicle and particularly for operating the vehicle in the aft or tractor first direction, the operator controls the direction and speed of travel of the vehicle with his or her left hand using the aft control handle 13, and operates the floor switch 20 and steering wheel 16 with the right foot and hand respectively. While facing either the fore or aft directions, therefore, the operator can control the speed and direction of the lift truck 10 with an operator control handle which is positioned to the side and ahead of the operator's centerline. This arrangement provides improved ease of control, and further provides stability for the operator, allowing the operator to grip a control in the direction the operator is facing. Furthermore, as the operator is not required to reach beside and slightly rearward of his or her centerline when facing in the aft direction to control travel of the vehicle, the operation is more comfortable, which is not only advantageous for the operator, but improves the overall productivity potential of the vehicle by decreasing the need for operator breaks during operation.

Although it is advantageous for the operator to control the travel of lift truck 10 with the multi-function control handle 14 when facing the forks and traveling in the forks first direction and the aft control handle 13 when facing the aft and traveling in the tractor first direction, either control handle 13 or 14 can be used to control the direction and speed of the vehicle in either direction. Typically, however, an operator will elect to control the vehicle with the aft control handle 13 when the lift truck 10 is operated for an extended period of time traveling in the tractor first direction and with the control handle 14 when operating for an extended period of travel in the forks first direction and when operating the load handling controls included on multi-function control handle 14.

Although the invention has been described with respect to a stand-up, fore-aft configuration vehicle, it will be apparent that the techniques disclosed can be applied to side-stance and seated-operator trucks as well, and nothing disclosed herein should be construed to limit the teaching of the invention to stand-up, fore-aft configuration trucks. Furthermore, while the invention has been described with reference to a lift truck, the invention could be applied to various other types of material handling vehicles.

While there has been shown and described what are at present considered the preferred embodiments of the invention, it will be obvious to those skilled in the art that various changes and modifications can be made therein without departing from the scope of the invention defined by the appended claims.

We claim:

1. A material handling vehicle, comprising:
an operator compartment including a floor;
a steering mechanism accessible to an operator standing in both of a fore vehicle direction and an aft vehicle direction;
a fore operator control handle for selecting a direction and a speed of travel, the fore control handle being mounted at a first end of the operator compartment and configured for operation in the fore vehicle direction;
an aft operator control handle for selecting a direction and a speed of travel, the aft operator control handle comprising a twist grip handle mounted to a second end of the compartment and configured for operation in the aft vehicle direction;
a floor switch mounted to the floor in a position accessible by an operator using the fore control handle and the aft control handle, and
a traction system controlled by the fore and aft operator control handles to drive the material handling vehicle in a selected direction, wherein the steering mechanism is mounted to be accessible to an operator facing the first end of the operator compartment and controlling the fore operator control handle and to an operator facing the second end of the compartment and controlling the aft operator control handle, and the floor switch is selectively activatable to enable operation from both the fore operator control handle and the aft operator control handle.

2. The material handling vehicle as defined in claim 1, wherein the fore operator control handle is a multi-function control handle.

3. The material handling vehicle as defined in claim 1, wherein the aft operator control handle includes a smooth outer grip.

4. The material handling vehicle as defined in claim 3, wherein the smooth outer grip is a thermoplastic.

5. The material handling vehicle as defined in claim 1, wherein the second handle includes recessed grooves.

6. The material handling vehicle as defined in claim 1, wherein the aft operator control handle is mounted at an angle as referenced to the side of the compartment selected to be substantially perpendicular of the arm of the operator when operating the control.

7. The material handling vehicle as defined in claim 1, wherein the steering mechanism is a steering wheel mounted to the compartment to allow an operator to rotate the steering wheel when using either the fore operator control handle or the aft operator control handle.

8. The material handling vehicle as defined in claim 1, wherein the aft operator control handle is mounted to the compartment a distance from the floor selected to provide a comfortable grip for users of varying heights.

9. The material handling vehicle as defined in claim 8 wherein the distance from the floor is substantially thirty-eight inches.

10. The material handling vehicle as defined in claim 1, wherein the aft operator control handle includes a horn actuator for activating a horn.

11. An operator compartment for a material handling vehicle comprising:
a first control handle mounted for access by an operator facing a first direction;
a second control handle mounted for access by an operator facing a second direction, the second control handle being mounted to be a distance from a floor of the compartment and at an angle referenced to a side of the compartment selected to be perpendicular to the arm of the operator while in use;
a floor switch positioned on a floor of the compartment in a location selected to be accessible by an operator using the first control handle and the second control handle to enable operation from both the first and second control handles; and
a steering wheel positioned in the compartment in a location selected to be accessible by an operator facing the first direction and using the first control handle and to an operator facing the second direction and using the second control handle, wherein the first handle is rotational in the first direction for motion in a first vehicle direction and the second handle is rotatable in the second direction for motion in a second vehicle direction.

12. The material handling vehicle of claim 11, wherein the first and second vehicle directions are the fore and aft directions of the vehicle.

13. The material handling vehicle of claim 11 wherein the second control handle is substantially horizontal.

14. The material handling vehicle of claim 11 wherein the distance from a floor is substantially thirty-eight inches.

15. The material handling vehicle as defined in claim 11, wherein the first and second control handles are each rotational around a substantially horizontal axis.

16. The material handling vehicle as defined in claim 11, wherein each of the first and second control handles are rotational in the second and first directions, respectively, to provide a control signal indicative of motion in the direction opposite the direction the operator is facing.

17. The material handling vehicle as defined in claim 11, wherein the second control handle is a twist grip handle.

18. The material handling vehicle as defined in claim 12, wherein the angle is substantially seventy degrees.

19. The material handling vehicle as defined in claim 12, wherein the second control handle comprises a horn actuator.

* * * * *